(12) United States Patent
Li et al.

(10) Patent No.: US 12,490,342 B2
(45) Date of Patent: Dec. 2, 2025

(54) NETWORK DEVICE AND METHOD FOR DETERMINING POWER SUPPLY RELATIONSHIP

(71) Applicant: HUAWEI TECHNOLOGIES CO., LTD., Guangdong (CN)

(72) Inventors: Jinfeng Li, Shenzhen (CN); Chunyuan Chen, Shanghai (CN); Bingxin Du, Shanghai (CN); Shenghao Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 22 days.

(21) Appl. No.: 18/585,296

(22) Filed: Feb. 23, 2024

(65) Prior Publication Data

US 2024/0195182 A1 Jun. 13, 2024

Related U.S. Application Data

(63) Continuation of application No. PCT/CN2022/101034, filed on Jun. 24, 2022.

(30) Foreign Application Priority Data

Aug. 26, 2021 (CN) .......................... 202110990376.1

(51) Int. Cl.
*H04W 88/08* (2009.01)
*H02J 13/00* (2006.01)
(Continued)

(52) U.S. Cl.
CPC ....... *H04W 88/08* (2013.01); *H02J 13/00002* (2020.01); *H04W 52/0206* (2013.01); *H04W 52/343* (2013.01); *Y02D 30/70* (2020.08)

(58) Field of Classification Search
CPC ............. H04W 52/0206; H04W 52/02; H04W 52/0203; H04W 52/00; H04W 52/04;
(Continued)

(56) References Cited

U.S. PATENT DOCUMENTS

2019/0281477 A1* 9/2019 Ding ..................... H04W 52/02
2020/0120595 A1 4/2020 Humla et al.
2021/0227460 A1* 7/2021 Ding ................... H04W 52/343

FOREIGN PATENT DOCUMENTS

CN 103648151 A 3/2014
CN 104333479 A 2/2015
(Continued)

OTHER PUBLICATIONS

International Search Report and Written Opinion issued in PCT Application No. PCT/CN2022/101034 dated Sep. 16, 2022.
(Continued)

*Primary Examiner* — Ryan Johnson

(57) ABSTRACT

This application discloses a network device and a method. The network device includes a plurality of power supply units, a plurality of radio frequency units, and a control unit. Each of the plurality of radio frequency units is connected to at least one of the plurality of power supply units. The control unit is connected to both the plurality of power supply units and the plurality of radio frequency units. The control unit is configured to: control a load on a first carrier to change in a first manner; obtain power consumption of the plurality of power supply units when the load on the first carrier changes; and determine, from the plurality of power supply units based on the power consumption of the plurality of power supply units, a first target power supply unit that supplies power to the radio frequency unit corresponding to the first carrier.

16 Claims, 3 Drawing Sheets

(51) Int. Cl.
*H04W 52/02* (2009.01)
*H04W 52/34* (2009.01)

(58) Field of Classification Search
CPC ... H04W 52/16; H04W 52/34; H04W 52/346; H04W 52/52; H04W 52/367; H04W 88/08; H04W 52/343; H02J 13/00002
See application file for complete search history.

(56) References Cited

FOREIGN PATENT DOCUMENTS

| | | |
|---|---|---|
| EP | 2423783 A1 | 2/2012 |
| EP | 2524569 B1 | 11/2012 |
| JP | 2013-516941 A | 5/2013 |
| JP | 2016225968 A | 12/2016 |
| JP | 2017135824 A | 8/2017 |

OTHER PUBLICATIONS

Extended European Search Report issued in EP Application No. 22860032.6 dated Dec. 19, 2024.

\* cited by examiner

NETWORK DEVICE AND METHOD FOR DETERMINING POWER SUPPLY RELATIONSHIP

CROSS-REFERENCE TO RELATED APPLICATIONS

This application is a continuation of International Application No. PCT/CN2022/101034, filed on Jun. 24, 2022, which claims priority to Chinese Patent Application No. 202110990376.1, filed on Aug. 26, 2021. The disclosures of the aforementioned applications are incorporated herein by reference in these entireties.

TECHNICAL FIELD

This application relates to the field of electric power technologies, and in particular, to a network device and a method for determining a power supply relationship.

BACKGROUND

As network devices such as base stations cover more frequency bands, radio frequency units are separately disposed in the base station for each frequency band, and power supply is performed by using different power supply units.

As there are a plurality of radio frequency units and a plurality of power supply units, if the base station needs to perform an operation such as power-off or power reduction on a specific radio frequency unit, the base station needs to first determine which power supply unit supplies power to the radio frequency unit, that is, needs to determine a power supply relationship.

In conventional technologies, the power supply relationship is manually determined. For example, determining a power supply unit that supplies power to a radio frequency unit is implemented by manually checking lines on site of a base station. This method is time-consuming and labor-intensive, and also raises a relatively high technical requirement on operators, making the manual check error-prone.

SUMMARY

This application provides a network device and a method for determining a power supply relationship. The power supply relationship between a power supply unit and a radio frequency unit is determined by controlling a load on a carrier of the radio frequency unit to vary with a rule, without manual participation.

According to a first aspect, this application provides a network device. The network device includes a plurality of power supply units, a plurality of radio frequency units, and a control unit. Each of the plurality of radio frequency units is connected to at least one of the plurality of power supply units. The control unit is connected to both the plurality of power supply units and the plurality of radio frequency units.

The control unit is configured to: control a load on a first carrier to change in a first manner, where the first carrier is a carrier of any of the plurality of radio frequency units; obtain power consumption of the plurality of power supply units when the load on the first carrier changes in the first manner; and determine, from the plurality of power supply units based on the power consumption of the plurality of power supply units, a first target power supply unit that supplies power to the radio frequency unit corresponding to the first carrier, where a manner in which power consumption of the first target power supply unit changes matches the first manner.

In an embodiment of this application, to obtain a power supply relationship between the power supply unit and the radio frequency unit, the control unit controls the load on the carrier of the radio frequency unit to change in the first manner. A change in the load on the carrier causes a change in the power consumption of the power supply unit that supplies power to the radio frequency unit. In this way, the control unit selects, based on a change of power consumption of each power supply unit, a power supply unit whose change of power consumption matches the first manner, and determines the power supply relationship between the power supply unit and the radio frequency unit. This manner does not require manual participation, saves time and labor, and can ensure accuracy of the power supply relationship.

For example, the first manner includes that the load on the first carrier alternates periodically between a first load and a second load, and the first load is greater than the second load.

For example, in each period, a duration range of the first load is two to five seconds, and a duration range of the second load is two to five seconds.

Herein, duration of the first load and duration of the second load may be the same, making it convenient to control. Certainly, the duration of the first load and the duration of the second load may alternatively be different.

In an implementation of this application, the control unit is configured to determine, based on the power consumption of the plurality of power supply units, whether a time period in which a first power supply unit in the plurality of power supply units is at first power consumption corresponds to a time period in which the first carrier is under the first load, and whether a time period in which the first power supply unit is at second power consumption corresponds to a time period in which the first carrier is under the second load, where the first power consumption is greater than the second power consumption, and the first power supply unit is any of the plurality of power supply units; and if the time period in which the first power supply unit in the plurality of power supply units is at the first power consumption corresponds to the time period in which the first carrier is under the first load, and the time period in which the first power supply unit is at the second power consumption corresponds to the time period in which the first carrier is under the second load, the control unit determines that the first power supply unit is the first target power supply unit.

For example, the load on the first carrier changes periodically. In each period, the duration of the first load is two seconds, and the duration of the second load is three seconds. In this case, the load on the first carrier changes in the following manner: The first carrier is under the first load for two seconds and under the second load for three seconds alternately. When the load on the first carrier is controlled to change in the foregoing manner, the power consumption of the first target power supply unit also presents a same change trend, that is, the first target power supply unit is at the first power consumption for two seconds and at the second power consumption for three seconds alternately.

Therefore, duration of each power supply unit at the first power consumption and at the second power consumption is determined. If the duration corresponds to the duration of the first load and the duration of the second load in terms of the carrier load, the power supply relationship between the power supply unit and the radio frequency unit can be determined.

To avoid impact of determining the foregoing power supply relationship on normal service sending, the control unit may perform the foregoing operations when a service volume is relatively small.

For example, the control unit is further configured to: before controlling the load on the first carrier to change in the first manner, determine a volume of to-be-sent services on the first carrier; and when the volume of to-be-sent services is less than a threshold, control the load on the first carrier to change in the first manner.

The to-be-sent service on the first carrier, although small in volume, if sent in the manner described in this application, may affect normal service transmission. Therefore, the control unit is further configured to: before controlling the load on the first carrier to change in the first manner, when the volume of to-be-sent services is less than the threshold, migrate a service on the first carrier to a second carrier, where the second carrier is a carrier of any of the plurality of radio frequency units except the radio frequency unit corresponding to the first carrier.

For example, after determining the power supply relationship between the radio frequency unit of the first carrier and the power supply unit, the control unit is further configured to control a load on a third carrier to change in a second manner, where the third carrier is a carrier of any of the plurality of radio frequency units except the radio frequency unit corresponding to the first carrier; obtain power consumption of the plurality of power supply units when the load on the third carrier changes in the second manner; and determine, from the plurality of power supply units based on the power consumption of the plurality of power supply units, a second target power supply unit, where a manner in which power consumption of the second target power supply unit changes matches the second manner.

For example, the control unit is further configured to notify a control device of information about the first target power supply unit that supplies power to the radio frequency unit corresponding to the first carrier, to enable the control device to generate a power supply topology of the radio frequency unit.

According to a second aspect, this application provides a method for determining a power supply relationship, including:
  controlling a load on a first carrier to change in a first manner, where the first carrier is a carrier of any of a plurality of radio frequency units in a network device;
  obtaining power consumption of a plurality of power supply units in the network device when the load on the first carrier changes in the first manner; and
  determining, from the plurality of power supply units based on the power consumption of the plurality of power supply units, a first target power supply unit that supplies power to the radio frequency unit corresponding to the first carrier, where a manner in which power consumption of the first target power supply unit changes matches the first manner.

For example, the first manner includes that the load on the first carrier alternates periodically between a first load and a second load, and the first load is greater than the second load.

For example, in each period, a duration range of the first load is two to five seconds, and a duration range of the second load is two to five seconds.

In an implementation of this application, the determining, from the plurality of power supply units based on the power consumption of the plurality of power supply units, a first target power supply unit includes:
  determining, based on the power consumption of the plurality of power supply units, whether a time period in which a first power supply unit in the plurality of power supply units is at first power consumption corresponds to a time period in which the first carrier is under the first load, and whether a time period in which the first power supply unit is at second power consumption corresponds to a time period in which the first carrier is under the second load, where the first power consumption is greater than the second power consumption, and the first power supply unit is any of the plurality of power supply units; and
  if the time period in which the first power supply unit in the plurality of power supply units is at the first power consumption corresponds to the time period in which the first carrier is under the first load, and the time period in which the first power supply unit is at the second power consumption corresponds to the time period in which the first carrier is under the second load, determining that the first power supply unit is the first target power supply unit.

Optionally, before the controlling a load on a first carrier to change in a first manner, the method further includes:
  determining a volume of to-be-sent services on the first carrier; and
  when the volume of to-be-sent services is less than a threshold, controlling the load on the first carrier to change in the first manner.

Optionally, before the controlling a load on a first carrier to change in a first manner, the method further includes:
  when the volume of to-be-sent services is less than the threshold, migrating a service on the first carrier to a second carrier, where the second carrier is a carrier of any of the plurality of radio frequency units except the radio frequency unit corresponding to the first carrier.

Optionally, the method further includes:
  controlling a load on a third carrier to change in a second manner, where the third carrier is a carrier of any of the plurality of radio frequency units except the radio frequency unit corresponding to the first carrier;
  obtaining power consumption of the plurality of power supply units when the load on the third carrier changes in the second manner; and
  determining, from the plurality of power supply units based on the power consumption of the plurality of power supply units, a second target power supply unit, where a manner in which power consumption of the second target power supply unit changes matches the second manner.

Optionally, the method further includes:
  notifying a control device of information about the first target power supply unit that supplies power to the radio frequency unit corresponding to the first carrier, to enable the control device to generate a power supply topology of the radio frequency unit.

According to a third aspect, this application provides a network device. The network device includes a processor and a memory. The memory is configured to store a software program and a module. The processor runs or executes the software program and/or the module stored in the memory, to enable the network device to implement the method in any possible implementation of the first aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated onto one chip, or may be separately disposed on different chips. A type of the memory and a manner in which the memory and the processor are disposed are not limited in embodiments of this application.

Optionally, the network device may be deployed on a public cloud to provide a power supply relationship determining service.

According to a fourth aspect, this application provides a computer program (product). The computer program (product) includes computer program code. When the computer program code is run by a computer, the computer is enabled to perform the method in any possible implementation of the first aspect.

According to a fifth aspect, this application provides a computer-readable storage medium. The computer-readable storage medium is configured to store program code to be executed by a processor, and the program code is used to implement the method in any possible implementation of the first aspect.

According to a sixth aspect, a chip is provided. The chip includes a processor. The processor is configured to invoke, from a memory, and run instructions stored in the memory, to enable a communication device in which the chip is installed to implement the method in any possible implementation of the first aspect.

According to a seventh aspect, another chip is provided. The chip includes an input interface, an output interface, a processor, and a memory. The input interface, the output interface, the processor, and the memory are connected to each other through an internal connection channel. The processor is configured to execute code in the memory. When the code is executed, the processor is configured to perform the method in any possible implementation of the first aspect.

According to an eighth aspect, a power supply relationship determining system is provided. The system includes a network device and a first system. The first system is configured for a user to purchase the network device, and the network device implements the method in any possible implementation of the first aspect.

According to a ninth aspect, another power supply relationship determining system is provided. The system includes a second system, and a network device. The second system is configured to manage and control the network device, and the network devices implement the method in any possible implementation of the first aspect.

According to a tenth aspect, still another power supply relationship determining system is provided. The system includes a network device. The network devices implement the method in any possible implementation of the first aspect.

According to an eleventh aspect, another power supply relationship determining system is provided. The system includes a first system, a second system, and a network device. The first system is configured for a user to purchase the network devices, the second system is configured to manage and control the network devices, and the network devices implement the method in any possible implementation of the first aspect.

DESCRIPTION OF EMBODIMENTS

To make the objectives, technical solutions, and advantages of this application clearer, the following further describes the implementations of this application in detail with reference to the accompanying drawings.

Figure 1:
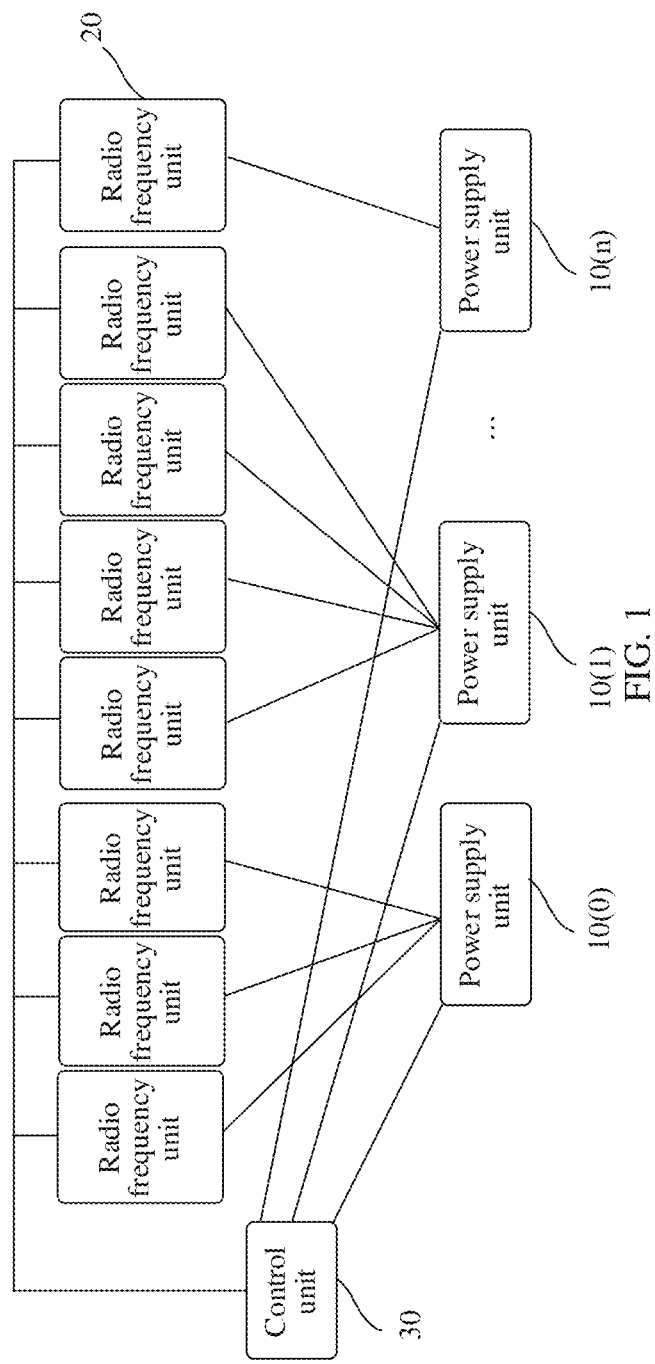
FIG. 1 is a schematic structural diagram of a network device according to an embodiment of this application.

FIG. 1 is a schematic structural diagram of a network device according to an embodiment of this application. With reference to FIG. 1, the network device includes a plurality of power supply units 10(0), 10(1), ..., 10 (n), a plurality of radio frequency units 20, and a control unit 30.

As shown in FIG. 1, each of the plurality of radio frequency units 20 is connected to one of the plurality of power supply units 10, that is, each radio frequency unit 20 needs to be powered by one power supply unit 10, and each power supply unit 10 may supply power to one or more radio frequency units 20. The control unit 30 is connected to both the plurality of power supply units 10 and the plurality of radio frequency units 20.

Certainly, in this application, each radio frequency unit is not restricted to be connected to only one power supply unit. In another implementation, each radio frequency unit is connected to two or more power supply units, that is, to be powered by two or more power supply units.

For example, the network device is a base station. The base station covers a plurality of frequency bands, for example, 2G/3G, 4G, and 5G. A plurality of radio frequency units 20 are disposed in the base station to support the plurality of frequency bands. Frequency bands supported by any two of the plurality of radio frequency units 20 are the same or different.

For example, the power supply unit 10 includes power management units (PMUs), the radio frequency unit 20 includes remote radio units (RRUs), and the control unit 30 includes baseband units (BBUs).

For example, one PMU includes one main power supply and one backup power supply.

For example, the control unit 30 includes a plurality of BBUs, and each BBU is connected to some PMUs and RRUs.

In an implementation of this embodiment of this application, the control unit 30 is configured to control a load on a first carrier to change in a first manner, where the first carrier is a carrier of any of the plurality of radio frequency units; obtain power consumption of the plurality of power supply units when the load on the first carrier changes in the first manner; and determine, from the plurality of power supply units based on the power consumption of the plurality of power supply units, a first target power supply unit that supplies power to the radio frequency unit corresponding to the first carrier, where a manner in which power consumption of the first target power supply unit changes matches the first manner.

The power consumption of the power supply unit includes a plurality of sampling values of the power consumption of the power supply unit in a time period in which the load on the first carrier changes in the first manner, and each sampling value represents power consumption of the power supply unit in a unit time.

In an embodiment of this application, to obtain a power supply relationship between the power supply unit and the radio frequency unit, the control unit controls the load on the carrier of the radio frequency unit to change in the first manner. A change in the load on the carrier causes a change in the power consumption of the power supply unit that supplies power to the radio frequency unit. In this way, the control unit selects, based on a change of power consumption of each power supply unit, a power supply unit whose change of power consumption matches the first manner, and determines the power supply relationship between the power supply unit and the radio frequency unit. This manner does not require manual participation, saves time and labor, and can ensure accuracy of the power supply relationship.

In a possible implementation, the first manner includes that the load on the first carrier alternates periodically between a first load and a second load, and the first load is greater than the second load. Correspondingly, the power consumption of the first target power supply unit also alternates periodically. The power consumption of the power supply unit is high when the power supply unit is under the first load, and the power consumption of the power supply unit is low when the power supply unit is under the second load. Therefore, the first target power supply unit can be accurately determined based on the power consumption of each power supply unit.

For example, in each period, a duration range of the first load is two to five seconds, and a duration range of the second load is two to five seconds. If the duration range is excessively short, the power supply relationship may be difficult to be identified accurately. If the duration range is excessively long, the power supply relationship may be slow to determine.

Herein, duration of the first load and duration of the second load may be the same, making it convenient to control. Certainly, the duration of the first load and the duration of the second load may alternatively be different.

In another possible implementation, the first manner may not be periodical. For example, the first manner includes that the load on the first carrier alternates between the first load and the second load, but duration of the first load is different each time, or duration of the second load is different each time.

For example, the first load is full load, that is, sending is performed on the carrier in a maximum transmission amount per unit time, and the second load is no load, that is, no sending is performed per unit time.

In an embodiment of the application, when determining the power supply relationship, the control unit may control an amount of data provided for the radio frequency unit in each time period. For example, in a first time period, the radio frequency unit is provided with the maximum transmission amount of data that can be sent by the radio frequency unit, so that the radio frequency unit is fully loaded to send data in the first time period; in the second time period, no data is provided for the radio frequency unit, so that the radio frequency unit has no data to send in the second time period, which corresponds to the foregoing no load.

In other implementations, at least one of the first load and the second load may be between full load and no load.

As described above, the power supply unit 10 includes a PMU. The PMU has a sensor component for detecting power consumption. The control unit may obtain the power consumption of the power supply unit by collecting a detection result from the sensor component.

In an embodiment of this application, the control unit 30 may determine the power supply relationship in the following manner:

determining, based on the power consumption of the plurality of power supply units, whether a time period in which a first power supply unit in the plurality of power supply units is at first power consumption corresponds to a time period in which the first carrier is under the first load, and whether a time period in which the first power supply unit is at second power consumption corresponds to a time period in which the first carrier is under the second load, where the first power consumption is greater than the second power consumption, and the first power supply unit is any of the plurality of power supply units; and if the time period in which the first power supply unit in the plurality of power supply units is at the first power consumption corresponds to the time period in which the first carrier is under the first load, and the time period in which the first power supply unit is at the second power consumption corresponds to the time period in which the first carrier is under the second load, determining that the first power supply unit is the first target power supply unit.

For example, the load on the first carrier changes periodically. In each period, the duration of the first load is two seconds, and the duration of the second load is three seconds. In this case, the load on the first carrier changes in the following manner: The first carrier is under the first load for two seconds and under the second load for three seconds alternately. When the load on the first carrier is controlled to change in the foregoing manner, the power consumption of the first target power supply unit also presents a same change trend, that is, the first target power supply unit is at the first power consumption for two seconds and at the second power consumption for three seconds alternately.

Therefore, duration of each power supply unit at the first power consumption and at the second power consumption is determined. If the duration corresponds to the duration of the first load and the duration of the second load in terms of the carrier load, the power supply relationship between the power supply unit and the radio frequency unit can be determined.

For example, to determine whether the time period in which the first power supply unit in the plurality of power supply units is at the first power consumption corresponds to the time period in which the first carrier is under the first load, and whether the time period in which the first power supply unit is at the second power consumption corresponds to the time period in which the first carrier is under the second load, the following manner may be used.

For example, the values of the power consumption and the load are converted into 0 and 1 for representation. For example, the first power consumption and the first load are represented as 1, and the second power consumption and the second load are represented as 0. If a bit representing the power consumption and a bit representing the load are the same at each time point, it is determined that the time period in which the first power supply unit in the plurality of power supply units is at the first power consumption corresponds to the time period in which the first carrier is under the first load, and that the time period in which the first power supply unit is at the second power consumption corresponds to the time period in which the first carrier is under the second load. If the bit representing the power consumption is different from the bit representing the load at each time point, the foregoing time periods do not correspond.

For another example, changes in power consumption and load are converted into a waveform diagram. For example, the first power consumption and the first load correspond to a same high bit in the waveform, and the second power consumption and the second load correspond to a same low bit in the waveform. If a waveform indicating a change in power consumption coincides with a waveform indicating a change in load, it is determined that the time period in which the first power supply unit in the plurality of power supply units is at the first power consumption corresponds to the time period in which the first carrier is under the first load, and the time period in which the first power supply unit is at the second power consumption corresponds to the time period in which the first carrier is under the second load. If the bit representing the power consumption is different from the bit representing the load at each time point, the foregoing time periods do not correspond.

To avoid impact of determining the foregoing power supply relationship on normal service sending, the control unit may perform the foregoing operations when a service volume is relatively small.

For example, the control unit 30 is further configured to: before controlling the load on the first carrier to change in the first manner, determine a volume of to-be-sent services on the first carrier; and when the volume of to-be-sent services is less than a threshold, control the load on the first carrier to change in the first manner.

The threshold may be set based on a daily service sending volume of the network device, to ensure that a volume of to-be-sent services of the network device is at a relatively low level when the method is performed.

The to-be-sent service on the first carrier, although small in volume, if sent in the manner described in this application, may affect normal service transmission. Therefore, the control unit 30 is further configured to: before controlling the load on the first carrier to change in the first manner, when the volume of to-be-sent services is less than the threshold, migrate a service on the first carrier to a second carrier, where the second carrier is a carrier of any of the plurality of radio frequency units except the radio frequency unit corresponding to the first carrier. The service on the first carrier is transferred to ensure normal service transmission.

For example, the control unit 30 restricts a service from accessing the first carrier, so that the service is migrated to the second carrier. Alternatively, the control unit 30 actively hands over the service to the second carrier.

Optionally, the control unit 30 is further configured to migrate the service on the second carrier back to the first carrier after determining the power supply unit that supplies power to the radio frequency unit of the first carrier.

In an embodiment of this application, the control unit 30 may traverse each radio frequency unit in the network device in a manner of determining the power supply relationship between the radio frequency unit of the first carrier and the power supply unit, to determine a power supply relationship between each radio frequency unit and a power supply unit, to obtain a power supply topology. The power supply topology includes a connection relationship between each radio frequency unit and the power supply unit.

For example, after determining the power supply relationship between the radio frequency unit of the first carrier and the power supply unit, the control unit is further configured to control a load on a third carrier to change in a second manner, where the third carrier is a carrier of any of the plurality of radio frequency units except the radio frequency unit corresponding to the first carrier; obtain power consumption of the plurality of power supply units when the load on the third carrier changes in the second manner; and determine, from the plurality of power supply units based on the power consumption of the plurality of power supply units, a second target power supply unit, where a manner in which power consumption of the second target power supply unit changes matches the second manner.

For example, the third carrier and the foregoing second carrier are the same carrier or different carriers.

For example, the second manner and the foregoing first manner are the same rule, making it convenient for the control unit to perform control. In another implementation, the second manner and the foregoing first manner are different rules.

For example, in this application, carriers may be numbered, for example, C0, C1, . . . , and Cn, and power supply units that supply power to radio frequency units corresponding to the carriers are sequentially determined.

For example, the control unit 30 first migrates a service on a carrier Cx to another carrier, and then determines a power supply unit that supplies power to a radio frequency unit corresponding to the carrier Cx; after the power supply unit that supplies power to the radio frequency unit corresponding to the carrier Cx is determined, migrates, back to the carrier Cx, the service that has been migrated to the another carrier. In the same manner, the control unit 30 processes the carrier Cx+1 and determines a power supply unit that supplies power to a radio frequency unit corresponding to the carrier Cx+1. Finally, a power supply unit corresponding to each radio frequency unit is determined. x is an integer ranging from 0 to n, and n is a positive integer.

As described above, in this application, the control unit may include a plurality of BBUs, and each BBU is connected to some RRUs. In this case, each BBU may determine a power supply relationship of the connected RRUs. The BBU-determined power supply relationships of the RRUs are summarized and reported to one of the RRUs or an upper-layer network management system, and the one of the RRUs or the upper-layer network management system generates a power supply topology.

For example, the control unit 30 is further configured to notify a control device of information about the first target power supply unit that supplies power to the radio frequency unit corresponding to the first carrier, to enable the control device to generate a power supply topology of the radio frequency unit.

The control device herein may be the foregoing upper-layer network management system.

In an embodiment of this application, the power supply topology refers to a connection relationship between each radio frequency unit and a corresponding power supply unit.

The following Table 1 provides an example of a power supply topology. Carriers that can be provided by radio frequency units correspond to several frequency bands: G, U, L, and NR. G corresponds to 2G, U corresponds to 3G, L corresponds to 4G, and NR corresponds to 5G.

TABLE 1

| Power supply unit | Carrier C | | | | Radio frequency unit |
|---|---|---|---|---|---|
| | G | U | L | NR | |
| PMU 0# | C0 | C2 | / | / | RRU 0#, RRU 2# |
| PMU 1# | / | C1 | C4 | C5 | RRU 1#, RRU 4#, RRU 5# |
| ... | ... | ... | ... | ... | ... |
| PMU n# | / | / | / | C3 | RRU 3# |

With reference to Table 1, each power supply unit corresponds to one or more radio frequency units. For example, a PMU 0 # corresponds to an RRU 0 # and an RRU 2 #; a PMU 1# corresponds to an RRU 1 #, an RRU 4 #, and an RRU 5 #; and a PMU n # corresponds to an RRU 3 #. In addition, the power supply topology table further shows a carrier corresponding to each radio frequency unit. For example, an RRU 0 # corresponds to a carrier C0, and an RRU 1# corresponds to a carrier C1. It should be noted that the correspondence between the RRU and the carrier already exists in the BBU.

In an embodiment of this application, after obtaining the power supply topology, the control unit 30 may perform power supply management based on the power supply topology. For example, powering off a power supply of a specified radio frequency unit specifically includes first determining a power supply unit corresponding to the radio frequency unit based on the power supply topology, and then controlling the power supply unit to power off the radio frequency unit. For another example, reducing power of a specified carrier specifically includes first determining a power supply unit corresponding to a radio frequency unit of the carrier based on the power supply topology, and then controlling the power supply unit to reduce power. The control unit 30 may control the power supply unit by sending an instruction to the power supply unit.

According to the foregoing solution, a power supply relationship between each radio frequency unit and a power supply unit in the network device can be obtained, so that operations such as precise power preparation of the network device and accurate power consumption mode switching can be implemented based on the power supply relationship.

Figure 2:
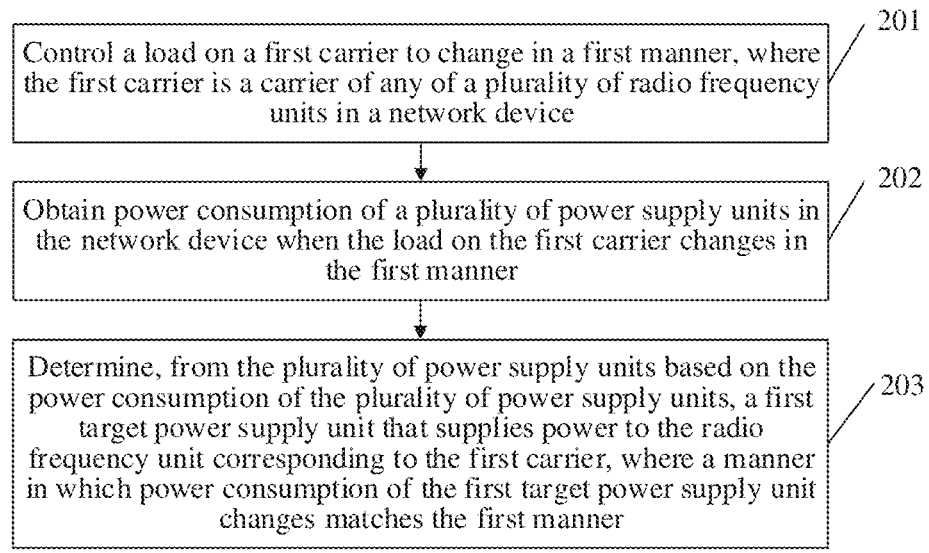
FIG. 2 is a flowchart of a method for determining a power supply relationship according to an embodiment of this application.

FIG. 2 is a flowchart of a method for determining a power supply relationship according to an embodiment of this application. The method is performed by the control unit in FIG. 1. With reference to FIG. 2, the method includes the following steps.

201: Control a load on a first carrier to change in a first manner, where the first carrier is a carrier of any of a plurality of radio frequency units in a network device.

202: Obtain power consumption of a plurality of power supply units in the network device when the load on the first carrier changes in the first manner.

203. Determine, from the plurality of power supply units based on the power consumption of the plurality of power supply units, a first target power supply unit that supplies power to the radio frequency unit corresponding to the first carrier, where a manner in which power consumption of the first target power supply unit changes matches the first manner.

In an embodiment of this application, to obtain a power supply relationship between the power supply unit and the radio frequency unit, the control unit controls the load on the carrier of the radio frequency unit to change in the first manner. A change in the load on the carrier causes a change in the power consumption of the power supply unit that supplies power to the radio frequency unit. In this way, the control unit selects, based on a change of power consumption of each power supply unit, a power supply unit whose change of power consumption matches the first manner, and determines the power supply relationship between the power supply unit and the radio frequency unit. This manner does not require manual participation, saves time and labor, and can ensure accuracy of the power supply relationship.

In a possible implementation, the first manner includes that the load on the first carrier alternates periodically between a first load and a second load, and the first load is greater than the second load. Correspondingly, the power consumption of the first target power supply unit also alternates periodically. The power consumption of the power supply unit is high when the power supply unit is under the first load, and the power consumption of the power supply unit is low when the power supply unit is under the second load. Therefore, the first target power supply unit can be accurately determined based on the power consumption of each power supply unit.

For example, in each period, a duration range of the first load is two to five seconds, and a duration range of the second load is two to five seconds.

Herein, duration of the first load and duration of the second load may be the same, making it convenient to control. Certainly, the duration of the first load and the duration of the second load may alternatively be different.

In another possible implementation, the first manner may not be periodical. For example, the first manner includes that the load on the first carrier alternates between the first load and the second load, but duration of the first load is different each time, or duration of the second load is different each time.

For example, the first load is full load, that is, sending is performed on the carrier in a maximum transmission amount per unit time, and the second load is no load, that is, no sending is performed per unit time.

In other implementations, at least one of the first load and the second load may be between full load and no load.

In this embodiment of this application, step 203 may include:

determining, based on the power consumption of the plurality of power supply units, whether a time period in which a first power supply unit in the plurality of power supply units is at first power consumption corresponds to a time period in which the first carrier is under the first load, and whether a time period in which the first power supply unit is at second power consumption corresponds to a time period in which the first carrier is under the second load, where the first power consumption is greater than the second power consumption, and the first power supply unit is any of the plurality of power supply units; and if the time period in which the first power supply unit in the plurality of power supply units is at the first power consumption corresponds to the time period in which the first carrier is under the first load, and the time period in which the first power supply unit is at the second power consumption corresponds to the time period in which the first carrier is under the second load, determining that the first power supply unit is the first target power supply unit.

For example, the load on the first carrier changes periodically. In each period, the duration of the first load is two seconds, and the duration of the second load is three seconds. In this case, the load on the first carrier changes in the following manner: The first carrier is under the first load for two seconds and under the second load for three seconds alternately. When the load on the first carrier is controlled to change in the foregoing manner, the power consumption of the first target power supply unit also presents a same change trend, that is, the first target power supply unit is at the first power consumption for two seconds and at the second power consumption for three seconds alternately.

Therefore, duration of each power supply unit at the first power consumption and at the second power consumption is determined. If the duration corresponds to the duration of the first load and the duration of the second load in terms of the carrier load, the power supply relationship between the power supply unit and the radio frequency unit can be determined.

For example, to determine whether the time period in which the first power supply unit in the plurality of power supply units is at the first power consumption corresponds to the time period in which the first carrier is under the first load, and whether the time period in which the first power supply unit is at the second power consumption corresponds to the time period in which the first carrier is under the second load, the following manner may be used.

For example, the values of the power consumption and the load are converted into 0 and 1 for representation. For example, the first power consumption and the first load are represented as 1, and the second power consumption and the second load are represented as 0. If a bit representing the power consumption and a bit representing the load are the same at each time point, it is determined that the time period in which the first power supply unit in the plurality of power supply units is at the first power consumption corresponds to the time period in which the first carrier is under the first load, and that the time period in which the first power supply unit is at the second power consumption corresponds to the time period in which the first carrier is under the second load. If the bit representing the power consumption is different from the bit representing the load at each time point, the foregoing time periods do not correspond.

For another example, changes in power consumption and load are converted into a waveform diagram. For example, the first power consumption and the first load correspond to a same high bit in the waveform, and the second power consumption and the second load correspond to a same low bit in the waveform. If a waveform indicating a change in power consumption coincides with a waveform indicating a change in load, it is determined that the time period in which the first power supply unit in the plurality of power supply units is at the first power consumption corresponds to the time period in which the first carrier is under the first load, and the time period in which the first power supply unit is at the second power consumption corresponds to the time period in which the first carrier is under the second load. If the bit representing the power consumption is different from the bit representing the load at each time point, the foregoing time periods do not correspond.

To avoid impact of determining the foregoing power supply relationship on normal service sending, the control unit may perform the foregoing operations when a service volume is relatively small.

Optionally, before the controlling a load on a first carrier to change in a first manner, the method further includes:
 determining a volume of to-be-sent services on the first carrier; and
 when the volume of to-be-sent services is less than a threshold, controlling the load on the first carrier to change in the first manner.

The to-be-sent service on the first carrier, although small in volume, if sent in the manner described in this application, may affect normal service transmission. Therefore, before the controlling a load on a first carrier to change in a first manner, the method further includes:
 when the volume of to-be-sent services is less than the threshold, migrating a service on the first carrier to a second carrier, where the second carrier is a carrier of any of the plurality of radio frequency units except the radio frequency unit corresponding to the first carrier. The service on the first carrier is transferred to ensure normal service transmission.

In an embodiment of this application, the control unit 30 may traverse each radio frequency unit in the network device in a manner of determining the power supply relationship between the radio frequency unit of the first carrier and the power supply unit, to determine a power supply relationship between each radio frequency unit and a power supply unit, to obtain a power supply topology. The power supply topology includes a connection relationship between each radio frequency unit and the power supply unit.

For example, after the determining the power supply relationship between the radio frequency unit and the power supply unit of the first carrier, the method further includes:
 controlling a load on a third carrier to change in a second manner, where the third carrier is a carrier of any of the plurality of radio frequency units except the radio frequency unit corresponding to the first carrier;
 obtaining power consumption of the plurality of power supply units when the load on the third carrier changes in the second manner; and
 determining, from the plurality of power supply units based on the power consumption of the plurality of power supply units, a second target power supply unit, where a manner in which power consumption of the second target power supply unit changes matches the second manner.

For example, the third carrier and the foregoing second carrier are the same carrier or different carriers.

For example, the second manner and the foregoing first manner are the same rule, making it convenient for the control unit to perform control. In another implementation, the second manner and the foregoing first manner are different rules.

For example, in this application, carriers may be numbered, for example, C0, C1, . . . , and Cn, and power supply units that supply power to radio frequency units corresponding to the carriers are sequentially determined.

Figure 3:
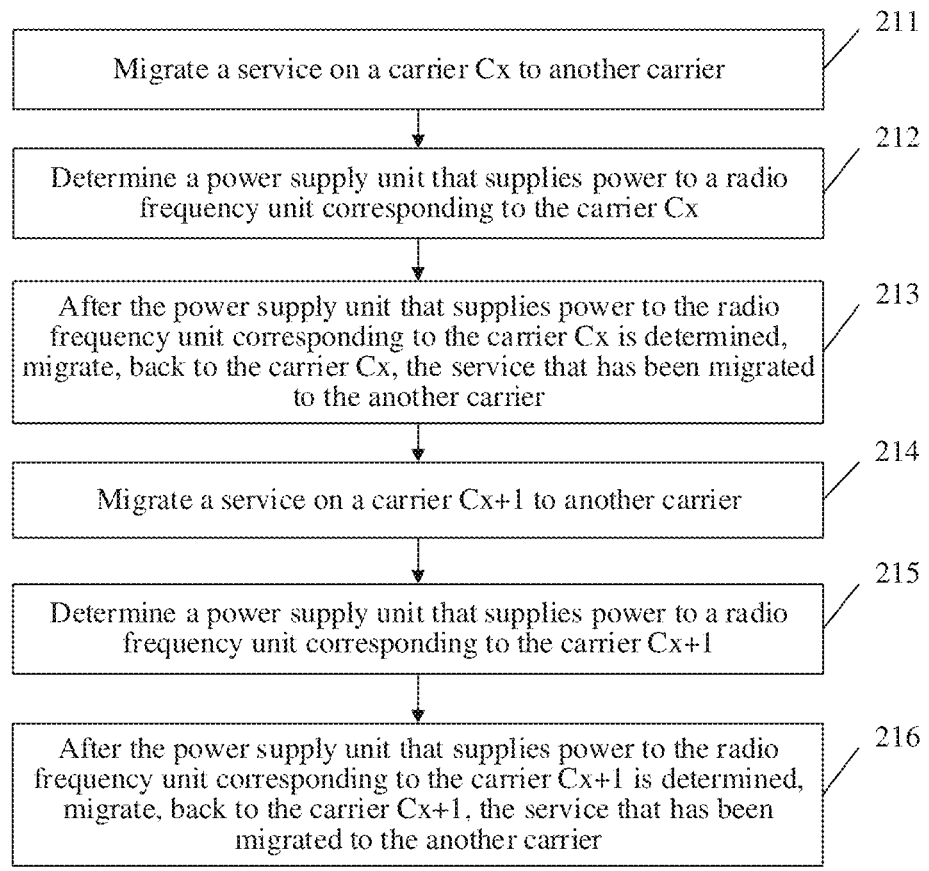
FIG. 3 is a flowchart of a method for determining a power supply relationship according to an embodiment of this application.

FIG. 3 is a flowchart of a method for determining a power supply relationship according to an embodiment of this application. The method is performed by the control unit in FIG. 1. With reference to FIG. 3, the method includes the following steps.

211: Migrate a service on a carrier Cx to another carrier. x is an integer ranging from 0 to n, and n is a positive integer.

212: Determine a power supply unit that supplies power to a radio frequency unit corresponding to the carrier Cx.

213: After the power supply unit that supplies power to the radio frequency unit corresponding to the carrier Cx is determined, migrate, back to the carrier Cx, the service that has been migrated to the another carrier.

Then, the carrier Cx+1 is processed in the same manner, that is, the following steps are included.

214: Migrate a service on the carrier Cx+1 to another carrier.

215: Determine a power supply unit that supplies power to a radio frequency unit corresponding to the carrier Cx+1.

216: After the power supply unit that supplies power to the radio frequency unit corresponding to the carrier Cx+1 is determined, migrate, back to the carrier Cx+1, the service that has been migrated to the another carrier.

The foregoing steps S211-S216 are cyclically performed, and finally a power supply unit corresponding to each radio frequency unit is obtained.

In this application, the control unit may include a plurality of BBUs, and each BBU is connected to some RRUs. In this case, each BBU may determine a power supply relationship of the connected RRUs. The BBU-determined power supply relationships of the RRUs are summarized and reported to one of the RRUs or an upper-layer network management system, and the one of the RRUs or the upper-layer network management system generates a power supply topology.

For example, the method further includes:
notifying a control device of information about the first target power supply unit that supplies power to the radio frequency unit corresponding to the first carrier, to enable the control device to generate a power supply topology of the radio frequency unit.

The control device herein may be the foregoing upper-layer network management system.

The method for determining a power supply relationship provided in the foregoing embodiment and the network device embodiment belong to a same concept. For a specific implementation process, refer to each other. Details are not described herein again.

Figure 4:
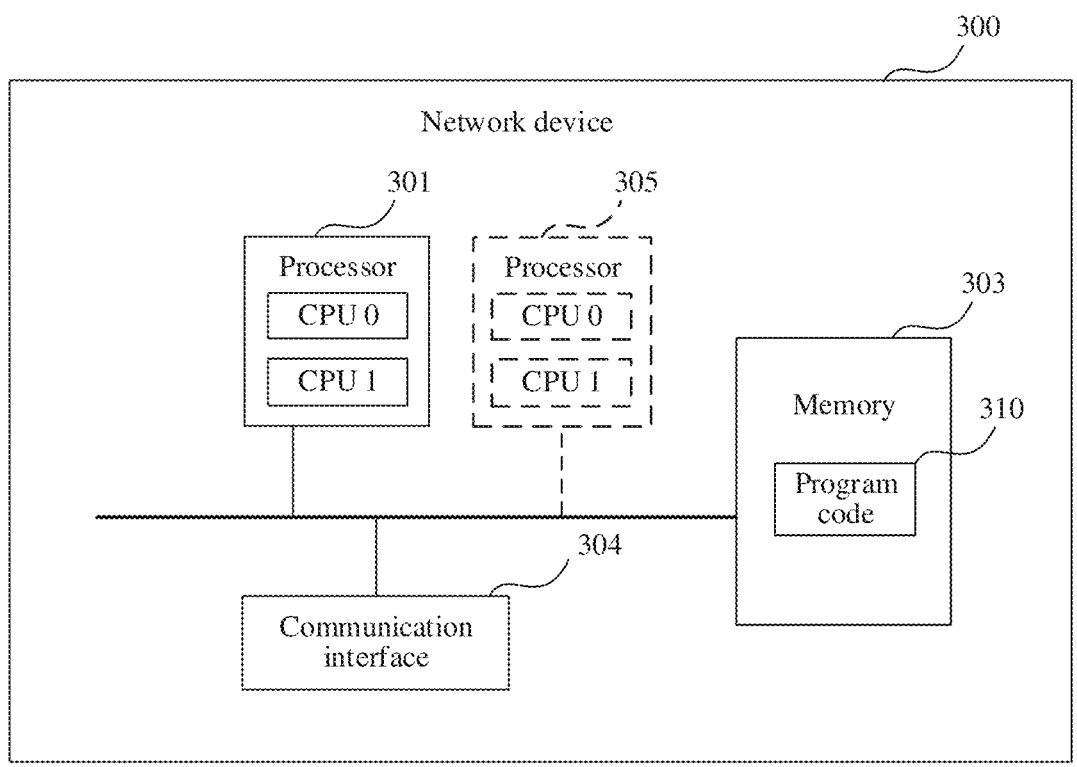
FIG. 4 is a block diagram of a network device according to an embodiment of this application.

FIG. 4 is a schematic structural diagram of a network device 300 according to an example embodiment of this application. The network device 300 shown in FIG. 4 is configured to perform operations related to the method for determining a power supply relationship shown in FIG. 2. The network device 300 may be implemented by a general bus architecture.

As shown in FIG. 4, the network device 300 includes at least one processor 301, a memory 303, and at least one communication interface 304.

The processor 301 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solution in this application. For example, the processor 301 includes an application-specific integrated circuit (ASIC), a programmable logic device (PLD) or another programmable logic device, a transistor logic device, a hardware component, or any combination thereof. The PLD may be, for example, a complex programmable logic device (CPLD), a field-programmable logic gate array (FPGA), a generic array logic (GAL), or any combination thereof. The PLD may implement or execute various logical blocks, modules, and circuits described with reference to content disclosed in embodiments of the present invention. Alternatively, the processor may be a combination of processors implementing a computing function, for example, a combination of one or more microprocessors, a combination of a DSP and a microprocessor, or the like.

Optionally, the network device 300 further includes a bus. The bus is configured to transmit information between components of the network device 300. The bus may be a peripheral component interconnect (PCI) bus, an extended industry standard architecture (EISA) bus, or the like. Buses may be classified into an address bus, a data bus, a control bus, and the like. For ease of representation, only one bold line is used for representation in FIG. 4, but this does not mean that there is only one bus or only one type of bus.

For example, the memory 303 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of an instruction or a data structure and that can be accessed by a computer. However, the memory 303 is not limited hereto. For example, the memory 303 exists independently, and is connected to the processor 301 through a bus. The memory 303 may alternatively be integrated with the processor 301.

The communication interface 304 uses any apparatus such as a transceiver, and is configured to communicate with another device or communication network. The communication network may be an Ethernet, a radio access network (RAN), a wireless local area network (WLAN), or the like. The communication interface 304 may include a wired communication interface or a wireless communication interface. Specifically, the communication interface 304 may be an Ethernet interface, a fast Ethernet (FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In an embodiment of this application, the communication interface 304 may be used by the network device 300 to communicate with another device.

In a specific implementation, in an embodiment, the processor 301 may include one or more CPUs, for example, a CPU 0 and a CPU 1 shown in FIG. 4. Each of the processors may be a single-CPU processor, or may be a multi-CPU processor. The processor herein may be one or more devices, circuits, and/or processing cores configured to process data (for example, computer program instructions).

In a specific implementation, in an embodiment, the network device 300 may include a plurality of processors, for example, the processor 301 and a processor 305 shown in FIG. 4. Each of the processors may be a single-CPU processor, or may be a multi-CPU processor. The processor herein may be one or more devices, circuits, and/or processing cores configured to process data (for example, computer program instructions).

In a specific implementation, in an embodiment, the network device 300 may further include an output device and an input device. The output device communicates with the processor 301, and may display information in a plurality of manners. For example, the output device may be a liquid crystal display (LCD), a light emitting diode (LED) display device, a cathode ray tube (CRT) display device, a projector, or the like. The input device communicates with the processor 301, and may receive a user input in a plurality of manners. For example, the input device may be a mouse, a keyboard, a touchscreen device, a sensor device, or the like.

In some embodiments, the memory 303 is configured to store program code 310 for executing the solutions in this application, and the processor 301 may execute the program code 310 stored in the memory 303. In other words, the network device 300 may implement, by using the processor 301 and the program code 310 in the memory 303, the method for determining a power supply relationship provided in the method embodiment. The program code 310 may include one or more software modules. Optionally, the processor 301 may also store program code or instructions for executing the solutions in this application.

In a specific embodiment, the network device 300 in an embodiment of this application may correspond to the network device in the foregoing method embodiments. The processor 301 in the network device 300 reads the instructions in the memory 303, to enable the network device 300 shown in FIG. 4 to perform all or some operations performed by the network device.

Specifically, the processor 301 is configured to control a load on a first carrier to change in a first manner, where the first carrier is a carrier of any of a plurality of radio frequency units; obtain power consumption of a plurality of power supply units when the load on the first carrier changes in the first manner; and determine, from the plurality of power supply units based on the power consumption of the plurality of power supply units, a first target power supply unit that supplies power to the radio frequency unit corresponding to the first carrier, where a manner in which power consumption of the first target power supply unit changes matches the first manner.

For brevity, other optional implementations are not described herein again.

Steps of the method for determining a power supply relationship shown in FIG. 2 are implemented by an integrated logic circuit of hardware in the processor of the network device 300 or through an instruction in a form of software. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in a memory. The processor reads information in the memory, and in combination with hardware of the processor, performs the steps of the foregoing methods. To avoid repetition, details are not described herein.

An embodiment of this application further provides a chip, including an input interface, an output interface, a processor, and a memory. The input interface, the output interface, the processor, and the memory are connected through an internal connection path. The processor is configured to execute code in the memory. When the code is executed, the processor is configured to perform any of the foregoing methods for determining a power supply relationship.

It should be understood that the processor may be a CPU, or may be another general-purpose processor, a DSP, an ASIC, an FPGA or another programmable logic device, a discrete gate, a transistor logic device, a discrete hardware component, or the like. The general-purpose processor may be a microprocessor, or may be any conventional processor or the like. It should be noted that the processor may be a processor that supports an ARM architecture.

Further, in an optional embodiment, there are one or more processors, and there are one or more memories. Optionally, the memory may be integrated with the processor, or the memory and the processor are separately disposed. The memory may include a read-only memory and a random access memory, and provides instructions and data to the processor. The memory may further include a nonvolatile random access memory. For example, the memory may further store a reference block and a target block.

The memory may be a volatile memory or a nonvolatile memory, or may include both a volatile memory and a nonvolatile memory. The nonvolatile memory may be a ROM, a PROM, an EPROM, an EEPROM, or a flash memory. The volatile memory may be a RAM, and serves as an external cache. By way of example rather than limitative description, many forms of RAMs may be used, for example, an SRAM, a DRAM, an SDRAM, a DDR SDRAM, an ESDRAM, an SLDRAM, and a DR RAM.

An embodiment of this application further provides a computer-readable storage medium. The computer-readable storage medium stores computer instructions. When the computer instructions stored in the computer-readable storage medium are executed by a computer device, the computer device is enabled to perform the foregoing method for determining a power supply relationship.

An embodiment of this application further provides a computer program product including instructions. When the computer program product runs on a computer device, the computer device is enabled to perform the foregoing method for determining a power supply relationship.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedures or functions according to this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network device comprising:
   a plurality of power supplies;
   a plurality of radio frequency devices, wherein each of the plurality of radio frequency devices is connected to at least one of the plurality of power supplies; and
   a controller, separately connected to the plurality of power supplies and the plurality of radio frequency devices, and configured to:
   control a load on a first carrier to change in a first manner, wherein the first carrier is a carrier of any of the plurality of radio frequency devices;
   obtain power consumption of the plurality of power supplies when the load on the first carrier changes in the first manner; and
   determine, from the plurality of power supplies based on the power consumption of the plurality of power supplies, a first target power supply that supplies power to the radio frequency device corresponding to the first carrier, wherein a manner in which power consumption of the first target power supply changes matches the first manner.

2. The network device according to claim 1, wherein the first manner comprises that the load on the first carrier alternates periodically between a first load and a second load, and the first load is greater than the second load.

3. The network device according to claim 2, wherein in each period, a duration range of the first load is two to five seconds, and a duration range of the second load is two to five seconds.

4. The network device according to claim 2, wherein the control controller is configured to determine, based on the power consumption of the plurality of power supplies, whether a time period in which a first power supply in the plurality of power supplies is at first power consumption corresponds to a time period in which the first carrier is under the first load, and whether a time period in which the first power supply is at second power consumption corresponds to a time period in which the first carrier is under the second load, wherein the first power consumption is greater than the second power consumption, and the first power supply unit is any of the plurality of power supplies; and if the time period in which the first power supply in the plurality of power supplies is at the first power consumption corresponds to the time period in which the first carrier is under the first load, and the time period in which the first power supply is at the second power consumption corresponds to the time period in which the first carrier is under the second load, determine that the first power supply is the first target power supply.

5. The network device according to claim 1, wherein the controller is further configured to: before controlling the load on the first carrier to change in the first manner, determine a volume of to-be-sent services on the first carrier; and when the volume of to-be-sent services is less than a threshold, control the load on the first carrier to change in the first manner.

6. The network device according to claim 5, wherein the controller is further configured to: before controlling the load on the first carrier to change in the first manner, when the volume of to-be-sent services is less than the threshold, migrate a service on the first carrier to a second carrier, wherein the second carrier is a carrier of any of the plurality of radio frequency devices except the radio frequency device corresponding to the first carrier.

7. The network device according to claim 1, wherein the controller is further configured to control a load on a third carrier to change in a second manner, wherein the third carrier is a carrier of any of the plurality of radio frequency devices except the radio frequency device corresponding to the first carrier; obtain power consumption of the plurality of power supplies when the load on the third carrier changes in the second manner; and determine, from the plurality of power supplies based on the power consumption of the plurality of power supplies, a second target power supply that supplies power to the radio frequency device corresponding to the third carrier, wherein a manner in which power consumption of the second target power supply changes matches the second manner.

8. The network device according to claim 1, wherein the controller is further configured to notify a control device of information about the first target power supply that supplies power to the radio frequency device corresponding to the first carrier, to enable the control device to generate a power supply topology of the radio frequency device.

9. A method for determining a power supply relationship, comprising:
   controlling a load on a first carrier to change in a first manner, wherein the first carrier is a carrier of any of a plurality of radio frequency devices in a network device;
   obtaining power consumption of a plurality of power supplies in the network device when the load on the first carrier changes in the first manner; and
   determining, from the plurality of power supplies based on the power consumption of the plurality of power supplies, a first target power supply that supplies power to the radio frequency device corresponding to the first carrier, wherein a manner in which power consumption of the first target power supply changes matches the first manner.

10. The method for determining a power supply relationship according to claim 9, wherein the first manner comprises that the load on the first carrier alternates periodically between a first load and a second load, and the first load is greater than the second load.

11. The method for determining a power supply relationship according to claim 10, wherein in each period, a duration range of the first load is two to five seconds, and a duration range of the second load is two to five seconds.

12. The method for determining a power supply relationship according to claim 10, wherein the determining, from the plurality of power supplies based on the power consumption of the plurality of power supplies, a first target power supply that supplies power to the radio frequency device corresponding to the first carrier comprises:
   determining, based on the power consumption of the plurality of power supplies, whether a time period in which a first power supply in the plurality of power supplies is at first power consumption corresponds to a time period in which the first carrier is under the first load, and whether a time period in which the first power supply is at second power consumption corresponds to a time period in which the first carrier is under the second load, wherein the first power consumption is greater than the second power consumption, and the first power supply is any of the plurality of power supplies; and
   if the time period in which the first power supply in the plurality of power supplies is at the first power consumption corresponds to the time period in which the first carrier is under the first load, and the time period in which the first power supply is at the second power consumption corresponds to the time period in which the first carrier is under the second load, determining that the first power supply is the first target power supply.

13. The method for determining a power supply relationship according to claim 9, wherein before the controlling the load on the first carrier to change in the first manner, the method further comprises:
- determining a volume of to-be-sent services on the first carrier; and
- when the volume of to-be-sent services is less than a threshold, controlling the load on the first carrier to change in the first manner.

14. The method for determining a power supply relationship according to claim 13, wherein before the controlling a load on a first carrier to change in a first manner, the method further comprises:
- when the volume of to-be-sent services is less than the threshold, migrating a service on the first carrier to a second carrier, wherein the second carrier is a carrier of any of the plurality of radio frequency devices except the radio frequency device corresponding to the first carrier.

15. The method for determining a power supply relationship according to claim 9, wherein the method further comprises:
- controlling a load on a third carrier to change in a second manner, wherein the third carrier is a carrier of any of the plurality of radio frequency devices except the radio frequency device corresponding to the first carrier;
- obtaining power consumption of the plurality of power supplies when the load on the third carrier changes in the second manner; and
- determining, from the plurality of power supplies based on the power consumption of the plurality of power supplies, a second target power supply, wherein a manner in which power consumption of the second target power supply changes matches the second manner.

16. The method for determining a power supply relationship according to claim 9, wherein the method further comprises:
- notifying a control device of information about the first target power supply that supplies power to the radio frequency device corresponding to the first carrier, to enable the control device to generate a power supply topology of the radio frequency device.

* * * * *

UNITED STATES PATENT AND TRADEMARK OFFICE
CERTIFICATE OF CORRECTION

| | | |
|---|---|---|
| PATENT NO. | : 12,490,342 B2 | Page 1 of 1 |
| APPLICATION NO. | : 18/585296 | |
| DATED | : December 2, 2025 | |
| INVENTOR(S) | : Jinfeng Li | |

It is certified that error appears in the above-identified patent and that said Letters Patent is hereby corrected as shown below:

In the Claims

Column 19, Line 34, Claim 4 – "control controller" should read "controller"

Column 19, Line 44, Claim 4 – "unit" should be removed

Signed and Sealed this
Thirteenth Day of January, 2026

John A. Squires
*Director of the United States Patent and Trademark Office*